United States Patent
Kim et al.

(10) Patent No.: US 12,119,500 B2
(45) Date of Patent: Oct. 15, 2024

(54) ELECTRODE ASSEMBLY HAVING IMPROVED SAFETY OF USE BY MEANS OF STRUCTURE IN WHICH LOCAL SITE IN EXTERIOR MATERIAL IS REINFORCED WITH ELASTIC POLYMER FILM, AND LITHIUM-ION SECONDARY BATTERY HAVING SAME

(71) Applicant: LiBEST INC., Daejeon (KR)

(72) Inventors: Joo Seong Kim, Daejeon (KR); Jin Hong Ha, Daejeon (KR); Gil Ju Lee, Daejeon (KR)

(73) Assignee: LiBEST INC., Daejeon (KR)

( * ) Notice: Subject to any disclaimer, the term of this patent is extended or adjusted under 35 U.S.C. 154(b) by 149 days.

(21) Appl. No.: 16/765,989

(22) PCT Filed: Nov. 21, 2018

(86) PCT No.: PCT/KR2018/014331
§ 371 (c)(1),
(2) Date: May 21, 2020

(87) PCT Pub. No.: WO2019/103447
PCT Pub. Date: May 31, 2019

(65) Prior Publication Data
US 2020/0358043 A1   Nov. 12, 2020

(30) Foreign Application Priority Data
Nov. 23, 2017   (KR) .................. 10-2017-0156926

(51) Int. Cl.
*H01M 50/103*   (2021.01)
*H01M 10/0525*   (2010.01)
(Continued)

(52) U.S. Cl.
CPC ..... *H01M 50/103* (2021.01); *H01M 10/0525* (2013.01); *H01M 10/0585* (2013.01);
(Continued)

(58) Field of Classification Search
CPC ............. H01M 50/103; H01M 50/116; H01M 50/155; H01M 50/54; H01M 50/124;
(Continued)

(56) References Cited

U.S. PATENT DOCUMENTS
2017/0077480 A1   3/2017  Hwang et al.

FOREIGN PATENT DOCUMENTS
CN   105261781 A  *  1/2016
JP   2012104284 A     5/2012
(Continued)

OTHER PUBLICATIONS

English Translation of CN105261781 A—Electrochemical battery and preparation method therefor Guangdong Zhuguang new energy science and technology co LTD; Yang Tujie; Jan. 20, 2016 (Year: 2016).*

(Continued)

*Primary Examiner* — Matthew T Martin
*Assistant Examiner* — Adam J Francis
(74) *Attorney, Agent, or Firm* — HSML P. C.

(57) ABSTRACT

A lithium ion secondary battery according to the present disclosure includes: an electrode assembly; and a case having a structure in which upper stamped portions and lower stamped portions are repeatedly stamped to cover the outside of the electrode assembly, and the upper stamped portions and the lower stamped portions form a corrugated pattern, and the electrode assembly includes: one or more unit cells each equipped with a pair of electrodes having different polarities with a separator interposed therebetween; an electrode mixture coated on one or both surfaces of the (Continued)

pair of electrodes; and electrode tabs protruded from the respective electrodes and not coated with the electrode mixture, and the electrode tabs include an electrode parallel connection tab and an electrode lead connection tab, and any one or more of the electrode parallel connection tab and the electrode lead connection tab is formed on the electrodes, and an elastic polymer film is overlapped on a local portion in the case.

12 Claims, 10 Drawing Sheets

(51) Int. Cl.
  *H01M 10/0585* (2010.01)
  *H01M 50/121* (2021.01)
  *H01M 50/124* (2021.01)
  *H01M 50/533* (2021.01)
  *H01M 50/54* (2021.01)
  *H01M 50/572* (2021.01)
  *H01M 50/574* (2021.01)
  *H01M 50/579* (2021.01)

(52) U.S. Cl.
  CPC ....... *H01M 50/121* (2021.01); *H01M 50/124* (2021.01); *H01M 50/533* (2021.01); *H01M 50/54* (2021.01); *H01M 50/572* (2021.01); *H01M 50/574* (2021.01); *H01M 50/579* (2021.01); *H01M 2220/30* (2013.01)

(58) Field of Classification Search
  CPC ............. H01M 50/533; H01M 50/121; H01M 10/0525; H01M 10/0585
  See application file for complete search history.

(56) References Cited

FOREIGN PATENT DOCUMENTS

| KR | 20080015165 A | * | 2/2008 |
|----|---------------|---|--------|
| KR | 1020160050960 A | | 5/2016 |
| KR | 1020160090104 A | | 7/2016 |
| KR | 1020170001048 A | | 1/2017 |
| KR | 101783703 B1 | | 10/2017 |
| KR | 101789066 B1 | | 10/2017 |

OTHER PUBLICATIONS

English Translation of KR20080015165A; Secondary battery with improved safety and compact structure; LG Chemical LTD; Jang Jun Hwan; Feb. 19, 2008 (Year: 2008).*
International Search Report of PCT/KR2018/014331, dated Feb. 28, 2019, in English.

* cited by examiner

FORM PATTERN
(UPPER STAMPED PORTIONS + LOWER STAMPED PORTIONS)
IN DIRECTION PARALLEL WITH WIDTH OF CASING

ELECTRODE ASSEMBLY HAVING IMPROVED SAFETY OF USE BY MEANS OF STRUCTURE IN WHICH LOCAL SITE IN EXTERIOR MATERIAL IS REINFORCED WITH ELASTIC POLYMER FILM, AND LITHIUM-ION SECONDARY BATTERY HAVING SAME

TECHNICAL FIELD

The present disclosure relates to a technique for inducing cutting of the outermost electrode equipped with an electrode lead connection tab and a parallel connection tab before the breakage of a case and an internal short circuit occur by overlapping an elastic polymer film on a local portion inside the case facing an electrode assembly forming a battery in order to prevent the risk of ignition or explosion caused by the breakage of the case and the internal short circuit which are mechanical problems of the battery and may occur due to bending and distortion, which is a repeated external force, in a flexible environment.

BACKGROUND

A secondary battery refers to a battery which can be charged and discharged, as opposed to a primary battery which cannot be charged, and has been widely used in the field of advanced electronic device fields such as cellular phone, notebook computer, camcorder, and the like. As the portable electronic devices are manufactured lighter with improved performance and the Internet of Things (IoT) advances, a lot of studies are being conducted on secondary batteries used as power supplies therefor.

Particularly, a lithium secondary battery has a higher voltage than a nickel-cadmium battery or a nickel-hydrogen battery mainly used as power supplies for portable electronic devices and also has a high energy density per unit weight. Therefore, demand for lithium secondary batteries is on the increase.

The secondary battery utilizes an electrochemical reaction occurring between an electrolyte and a negative electrode and a positive electrode when the negative electrode and the positive electrode are connected to each other while they are inserted into the electrolyte. Unlike conventional primary batteries, the secondary battery is a chargeable and dischargeable battery which can be recharged with energy by a charger and used again when energy is consumed by an electronic device. Therefore, the use of secondary batteries has increased with the popularization of wireless electronic devices.

Typically, a jelly-roll type electrode assembly in which a separator is inserted between a positive electrode and a negative electrode and then spirally wound together, or a flexible stacked type electrode assembly in which multiple positive electrodes and negative electrodes are stacked with a separator interposed therebetween has been used as the lithium secondary battery. For example, a cylindrical battery is manufactured by housing the jelly-roll type electrode assembly in a cylindrical can, injecting an electrolyte thereinto, and sealing the can, and a prismatic battery is manufactured by pressing the jelly-roll type electrode assembly or the stacked type electrode assembly to be flat and housing the flat electrode assembly in a prismatic can. Further, a pouch type battery is manufactured by packing the jelly-roll type electrode assembly or the stacked type electrode assembly together with an electrolyte in a pouch type case. In such an electrode assembly, a positive electrode tab and a negative electrode tab are withdrawn from a positive electrode and a negative electrode, respectively, to the outside of the electrode assembly and then connected to a negative electrode and a positive electrode of a secondary battery.

Meanwhile, in a conventional pouch type lithium secondary battery, a case forming an outer side of the lithium secondary battery is damaged by an intentional force applied from the outside, and, thus, an electrolyte accommodated in the case leaks out and outside air flows into the case. The leakage of the electrolyte inhibits normal operations of peripheral components such as a battery protection circuit by, for example, corroding the peripheral components. Also, the inflow of the outside air causes big safety problems such as ignition.

As a way to improve the durability of a lithium secondary battery, a pattern is formed on a case forming the lithium secondary battery and a terminal reinforcing structure is applied, which enables stable electrochemical driving in spite of bending and distortion which is a repeatedly applied force.

Meanwhile, in a flexible environment, the case may be broken by repeated bending and distortion and a short circuit may occur due to the misalignment and deviation of internal electrodes, which may cause the risk of ignition or explosion. The internal short circuit causes excessive current flow in proportion to a contact area between a positive electrode and a negative electrode, and, thus, a lot of heat is generated. In this case, a secondary short circuit may additionally occur, and, thus, there is the risk of ignition and explosion.

In general, all electrodes in a winding type battery or a general stacked type battery are connected to the outside, and, thus, an internal short circuit occurs when the electrodes and a separator are damaged due to an external impact.

When the internal short circuit occurs as described above, even if an internal electrode or the outermost electrode, which may be a part of an electrode assembly, is broken, there may be a problem that the capacity is reduced. However, a current can flow to the outside of the electrode assembly, and, thus, there is no problem in the operation of the battery. However, when the battery is continuously used with the internal electrode that is broken or cut, there may be a problem of safety.

To overcome a problem that when an external force is applied to an electrode assembly included in a conventional pouch type battery, the breakage of the electrode assembly and the lack of an electrolyte therein occur, Korean Patent Laid-open Publication No. 10-2016-0090104 discloses an electrode assembly for a flexible battery in which a reinforcing member is provided on one side of the electrode assembly to suppress breakage even when an external force is applied thereto.

Patent Document 1: KR10-2016-0090104A

DISCLOSURE OF THE INVENTION

Problems to be Solved by the Invention

The present disclosure provides a structure for inducing cutting of the outermost electrode equipped with an electrode lead connection tab before the breakage of a case and an internal short circuit occur by overlapping an elastic polymer film on a local portion inside the case facing an electrode assembly forming a battery and thus for securing the safety in use.

Means for Solving the Problems

To solve the above-described problem, a lithium ion secondary battery according to the present disclosure includes: an electrode assembly; and a case having a structure in which upper stamped portions and lower stamped portions are repeatedly stamped to cover the outside of the electrode assembly, and the upper stamped portions and the lower stamped portions form a corrugated pattern, and the electrode assembly includes: one or more unit cells each equipped with a pair of electrodes having different polarities with a separator interposed therebetween; an electrode mixture coated on one or both surfaces of the pair of electrodes; and electrode tabs protruded from the respective electrodes and not coated with the electrode mixture, and the electrode tabs include an electrode parallel connection tab and an electrode lead connection tab, and any one or more of the electrode parallel connection tab and the electrode lead connection tab is formed on the electrodes, and an elastic polymer film is overlapped on a local portion in the electrode assembly facing the case.

The local portion on which the elastic polymer film is overlapped is X which equals to $\frac{1}{15}$ to $\frac{1}{3}$ of the entire length L of the case.

A Shore hardness of the elastic polymer film is from 30 to 80 (Shore A, A Type).

The elastic polymer film contains any one or more selected from the group consisting of unsaturated rubbers that can be cured by sulfur vulcanization, saturated rubbers that cannot be cured by sulfur vulcanization and thermoplastic elastomers.

The electrode lead further includes an outermost negative electrode placed on an outermost region and an outermost positive electrode placed as one body on the inside of the outermost negative electrode, and each of the outermost negative electrode and the outermost positive electrode is equipped with an electrode parallel connection tab and an electrode lead connection tab.

The electrode assembly further includes a reinforcing tab welded and fixed on any one electrode lead connection tab among the electrode tabs included in the electrode assembly.

The electrode lead joined on any one electrode lead connection tab among the electrode tabs included in the electrode assembly further includes a bending structure that is bent in an 180° opposite direction toward the outside of the electrode assembly while it is welded toward the electrode assembly.

A tab-lead joint portion in which the electrode lead connection tab and the electrode lead are located using the reinforcing tab is inserted and aligned in the separator.

A tab-lead joint portion in which the electrode lead connection tab and the electrode lead having the bending structure are joined to each other is inserted and aligned in the separator.

One surface of the outermost negative electrode placed on each of an uppermost stage and a lowermost stage of the electrode assembly is coated with the electrode mixture

EFFECTS OF THE INVENTION

According to the present disclosure, when tensile stress and compressive stress caused by external bending are repeatedly applied onto the electrode assembly, a portion of the outermost electrode corresponding to a partial region of the case where an elastic polymer film is locally formed is cut because it is locally applied with severer stress caused by repeated warpage and bending from the outside than the other portion, and, thus, the current is cut off. Therefore, the function of a battery is lost and the safety in use can be secured.

Also, as the charge/discharge proceeds, the electrode expands and contracts in volume. A portion of the electrode corresponding to a different pattern from the basic pattern continues to expand in volume and is locally applied with severer stress caused by repeated warpage and bending from the outside than the other portion.

When the outermost electrode equipped with an electrode lead connection tab and a parallel connection tab is cut, only one passage for electrons in an active material to move to the outside is cut, and, thus, the current is cut off. Therefore, while the function of the battery is lost, the safety in use can be secured.

The outermost electrode and the other general electrodes included in the electrode assembly according to the present disclosure are connected by a parallel connection tab, and on the outermost electrode, a terminal is formed on an electrode lead connection tab. When an external force, such as bending and distortion, is applied from the outside, the outermost electrode is damaged and cut preferentially over the general electrodes placed on the inside of the outermost electrode. If the outermost electrode equipped with the electrode lead connection tab is cut, the general electrodes connected by the parallel connection tab are shut down while a current is cut off. Therefore, the capacity is sharply reduced and the battery cannot perform its original function.

BEST MODE FOR CARRYING OUT THE INVENTION

Hereafter, a flexible battery according to the present disclosure will be described with reference to the accompanying drawings.

The following exemplary embodiments are provided only for understanding of the present disclosure but not intended to limit the right scope of the present disclosure. Therefore, the inventions that perform the same functions in the same scope as the present disclosure are also included in the right scope of the present disclosure.

Hereinafter, some embodiments of the present disclosure will be described in detail with reference to the accompanying drawings. When reference numerals refer to components of each drawing, although the same components are illustrated in different drawings, the same components are referred to by the same reference numerals as possible. Further, if it is considered that description of related known configuration or function may cloud the gist of the present disclosure, the description thereof will be omitted.

Figure 1:
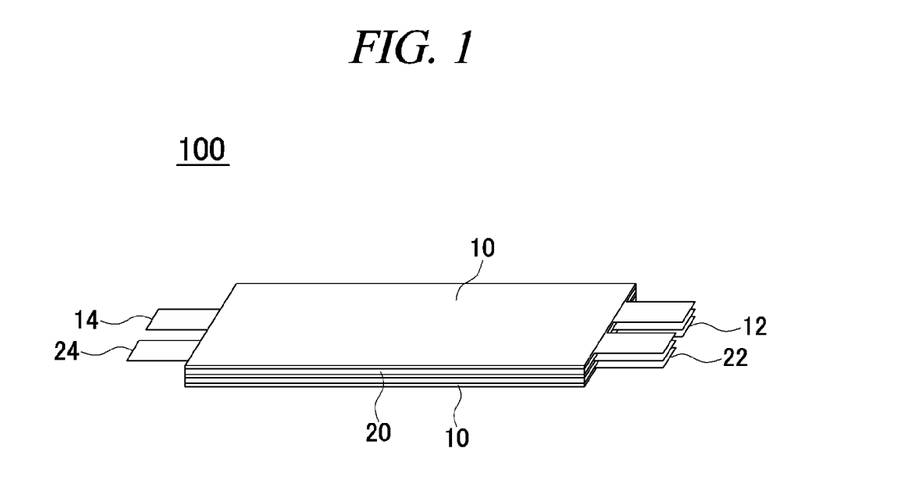
FIG. 1 is an illustration of an exemplary configuration of an electrode assembly included in a flexible battery according to the present disclosure.
Figure 2:
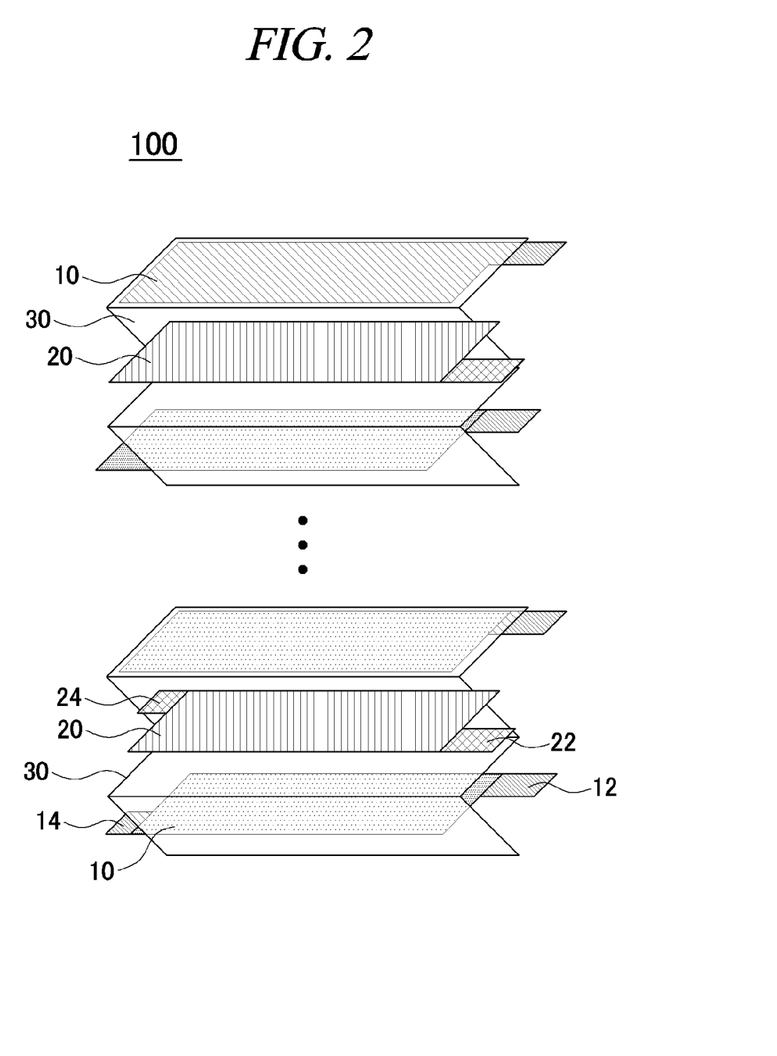
FIG. 2 and FIG. 3 are exploded views of the electrode assembly in which a negative electrode is placed as the outermost electrode according to an embodiment.
Figure 3:
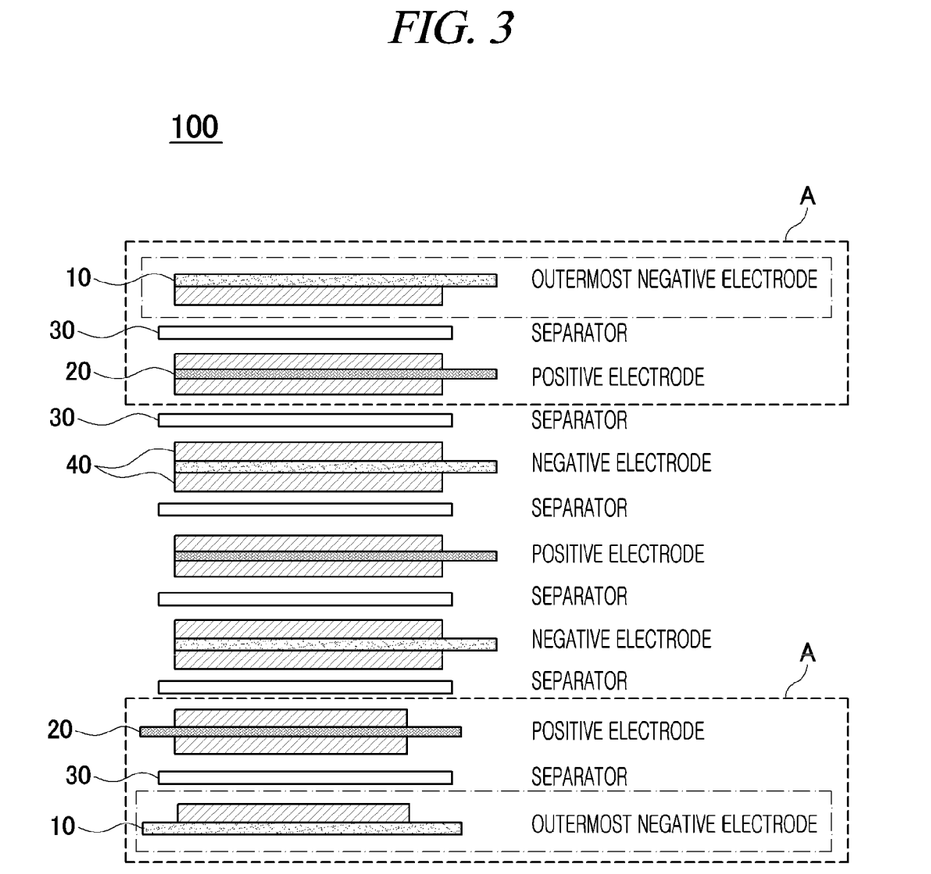

Referring to FIG. 1 to FIG. 3, an electrode assembly that can induce cutting of the outermost electrode facing a partial region of a case locally overlapped with an elastic polymer reinforcing film and thus improve the stability in use of a battery according to an embodiment of the present disclosure will be described.

An electrode assembly 100 includes unit cells A each including a negative electrode 10 and a positive electrode 20 with a separator 30 interposed therebetween, an electrolyte serving as an ion transport medium between the positive electrode and the negative electrode, and electrode tabs protruded from the electrodes and used for electrode parallel connection and electrode lead connection depending on the application. Any one or more of the electrodes including the negative electrode 10 and the positive electrode 20 is equipped on both sides with an electrode parallel connection tab and an electrode lead connection tab spaced apart from each other. For example, a certain outermost positive electrode 10 placed on the lowermost stage of the electrode assembly 100 is equipped with a negative electrode parallel connection tab 12 and a negative electrode lead connection tab 14, and a certain positive electrode placed on a stage right on the outermost negative electrode is equipped with a positive electrode parallel connection tab 22 and a positive electrode lead connection tab 24. That is, a negative electrode and a positive electrode each equipped with an electrode parallel connection tab and an electrode lead connection tab are placed as one body on the lowermost stage of the electrode assembly.

In the electrodes, one or both surfaces of each electrode serving as a current collector are coated with an electrode mixture and the electrode parallel connection tabs and the electrode lead connection tabs are protruded from the electrodes. The electrode parallel connection tabs and the electrode lead connection tabs are exposed without being coated with the electrode mixture.

Some of the multiple electrodes having the same polarity are connected to each other through an electrode parallel connection tab. That is, multiple negative electrodes 10 and multiple positive electrodes 20 are electrically connected in parallel with each other by a tab-tab joint portion connecting electrode tabs.

The electrode assembly is electrically connected through the electrode lead connection tab to an electrode lead exposed to the outside of a case. The separator physically separates the electrodes, but allows ions contained in the electrolyte to pass through.

As for the negative electrodes placed on the uppermost stage and the lowermost stage of the electrode assembly, only one surface of each negative electrode may be coated with a negative electrode mixture 40.

The electrode parallel connection tab 12 or 22 protruded on the negative electrode 10 or the positive electrode 20 electrically connects electrodes having the same polarity in parallel with each other. Tab-tab joint portions connected in parallel with each other are located on the separator covering an outer surface of the outermost electrode placed on the uppermost stage or the lowermost stage of the electrode assembly and then finished and taped.

In the present disclosure, a tab-tab joint portion where the electrode parallel connection tabs 12 and 22 on the electrode are connected in parallel with each other and a tab-lead joint portion where the electrode lead connection tabs 14 and 24 and the electrode lead are connected to each other are electrically connected and joined to each other by any one of joint methods including spot welding, ultrasonic welding, laser welding, and joining with a conductive adhesive.

All the electrodes placed on the uppermost stage and the lowermost stage of the electrode assembly are negative electrodes. However, this is just an example and the present disclosure is not limited thereto. In the present disclosure, the uppermost and lowermost electrodes may be placed within the electrode assembly as any one of combinations including negative electrode/negative electrode, positive electrode/negative electrode positive, negative electrode/positive electrode, and positive electrode/positive electrode.

The electrode assembly according to the present disclosure further includes a separate reinforcing tab on the electrode lead connection tabs 14 and 24 placed on one side of the electrode assembly. The reinforcing tab is joined to an electrode lead, and, thus, the tab-lead joint portion having an overlapping structure for the electrode lead connection tabs 14 and 24 and the electrode lead is formed using the reinforcing tab. The reinforced joint method for the electrode lead connection tabs 14 and 24 and the electrode lead using the reinforcing tab is applied to at least any one of a positive electrode tab and a negative electrode tab.

The reinforcing tab reinforces the strength of joint portions between the respective electrode lead connection tabs 14 and 24 and the electrode lead and thus physically reinforces the joint portions. For example, on an upper stage of the electrode lead connection tab extended from the electrode of the electrode assembly, the reinforcing tab formed of a homogeneous or heterogeneous metal and having a thickness one to five times greater than the electrode lead connection tab is overlapped and welded. The overlapped reinforcing tab and the electrode lead connection tab may have the same thickness or different thicknesses. The overlapped reinforcing tab may have a width of 3 mm to 5 mm and a length of 2 mm to 4 mm. However, this is just an example and the present disclosure is not limited thereto.

Specifically, the electrode lead assembled on the reinforcing tab overlapped and joined to the electrode lead connection tab may have a width of 2 mm to 3 mm and a length of 0.5 mm to 1 mm. However, this is just an example and the present disclosure is not limited thereto. The current collector of the electrode in the present disclosure may be any one of a group consisting of aluminum, stainless steel and copper, and the electrode lead may be formed of any one material of a group consisting of aluminum, nickel and nickel-coated copper. The reinforcing tab overlapped on the tab-lead joint portion for the electrode lead connection tab and the electrode lead is formed into any one shape of a group consisting of a circular shape, an oval shape and a polygonal shape.

In the electrode assembly according to the present disclosure, an electrode lead bending joint structure may be joined on the electrode lead connection tabs 14 and 24.

While the electrode lead is placed in parallel above the electrode lead connection tab, a part of an end of the electrode lead is welded on an upper end of the electrode lead connection tab. In this state, the electrode lead is bent 180°, and, thus, the electrode lead is bent from the electrode lead connection tab toward the outside of the electrode assembly. Accordingly, it is possible to obtain a joint reinforcing structure between the electrode tab and the electrode lead with a minimized local mechanical load in a flexible environment.

This method of joining the electrode lead connection tab and the electrode lead by bending can be applied to at least any one of a positive electrode tab and a negative electrode tab. The electrode lead joined on the electrode lead connection tab may have a width of 2 mm to 3 mm and a length of 1 mm to 3 mm. However, this is just an example and the present disclosure is not limited thereto.

The tab-lead joint portions in which the electrode lead connection tabs 14 and 24 are joined to the electrode lead using the reinforcing tab and the tab-lead joint portion in which the electrode lead connection tab is joined to the electrode lead having a bending tab structure are inserted/aligned in the separator. Accordingly, it is possible to protect a flexible battery by suppressing the exposure of a terminal portion to the outside which is the greatest weakness of the flexible battery.

Figure 4:
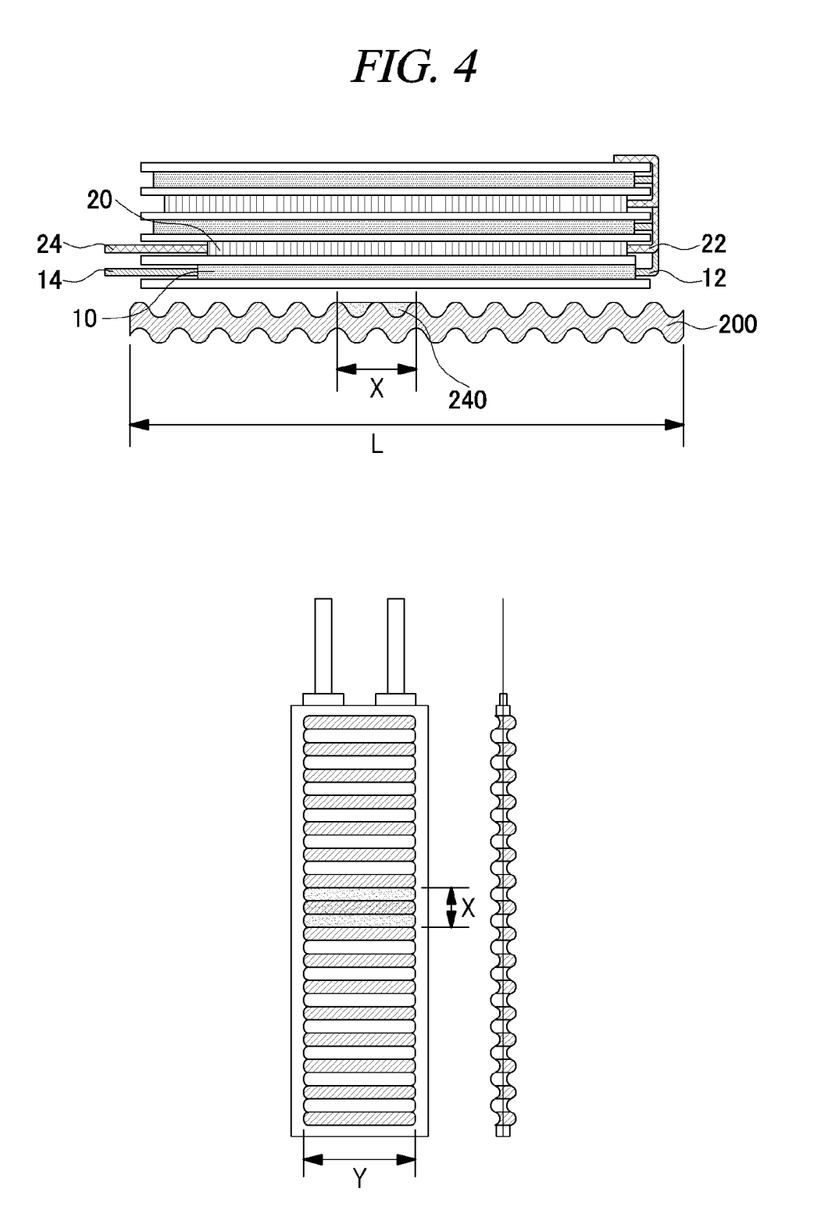
FIG. 4 illustrates that a case having a corrugated pattern overlapped with an elastic polymer film covers the outside of the electrode assembly.

FIG. 4 illustrates that a case having a corrugated pattern overlapped with an elastic polymer film covers the outside of the electrode assembly.

On a case 200 covering the outside of the electrode assembly 100, an elastic polymer reinforcing film 240 having elasticity can be placed at any location on the entire length L in a longitudinal direction of the case 200.

The elastic polymer reinforcing film 240 is thermally compressed and placed on valleys of the case 200 having the corrugated pattern. The elastic polymer reinforcing film 240 can be thermally compressed or alternately placed on all of the valleys of the case 200 along the longitudinal direction.

Desirably, a length X of the local portion on which the elastic polymer reinforcing film is overlapped is set to ⅕ to ¼ of the entire length L of the case and a width Y of the local portion is equal to the width of an electrode inside the electrode assembly. This is because cutting of the outermost electrode can be effectively induced by adhesion inside the case depending on the size of the elastic polymer reinforcing film portion and bending applied from the outside.

The width Y of the elastic polymer reinforcing film portion should be designed not to intrude into a sealing portion of the case in order to avoid threats to stability of the battery, such as the leakage of an electrolyte and the inflow of outside air, caused by damage to the sealing portion when the case is sealed.

If the length X of the elastic polymer reinforcing film portion is less than ⅕ of the length L, cutting of the outermost electrode cannot be effectively induced and the elastic polymer film cannot be easily overlapped on the case by thermal compression.

If the length X is more than ⅓ of the length L of the case, stress applied by repeated warpage and bending can be dispersed to a wide range of the elastic polymer reinforcing film portion, which makes it difficult to effectively induce cutting of the outermost electrode.

The elastic polymer reinforcing film 240 may be SEBS (styrene-ethylene-butylene-styrene, TPR).

The elastic polymer reinforcing film contains any one or more selected from the group consisting of unsaturated rubbers that can be cured by sulfur vulcanization, saturated rubbers that cannot be cured by sulfur vulcanization and thermoplastic elastomers.

The unsaturated rubbers that can be cured by sulfur vulcanization include natural polyisoprene (cis-1,4-polyisoprene (natural rubber), trans-1,4-polyisoprene (Gutta-percha)), polyisoprene rubber (IR), polybutadiene rubber (BR), polychloropene rubber (CR), Neoprene, Bayprene etc., poly(isobutyleneco-isoprene) rubber (IIR), chloro IIR (CIIR), bromo IIR (BIIR), poly(styreneco-butadiene) rubber (SBR), poly(acrylonitrile-co-butadiene) rubber (NBR), hydrogenated NBR (HNBR), Therban, Zetpol and the like.

The saturated rubbers that cannot be cured by sulfur vulcanization include epichlorohydrin rubber (ECO), polyacrylic rubber (ACM, ABR), silicone rubber (SI, Q, VMQ), fluorosilicone rubber (FVMQ), polyether block amides (PEBA), chlorosulfonated polyethylene (CSM), Hypalon, ethylene-vinyl acetate (EVA) and the like.

The thermoplastic elastomers include thermoplastic styrenic block copolymers (TPE-s), for example, polystyrene-blockpolybutadiene-block-polystyrene (SBS), polystyrene-block-polyisoprene-block-polystyrene (SIS), polystyrene-block-poly(ethylene-ran-propylene)-block-polystyrene (SEPS), polystyrene-block-poly(ethylene-ran-butylene)-blockpolystyrene (SEBS) and the like.

The thermoplastic elastomers may also include olefin polymer blends, called thermoplastic polyolefin blends (TPE-o). These polymers are elastomeric alloys obtained by mixing the above-described TPE-s, such as SBS, SIS, SEPS and SEBS, with polyolefin, such as PS, PP and PE. Further, the thermoplastic elastomers may include thermoplastic polyurethanes (TPU), thermoplastic copolyester, thermoplastic polyamides and the like.

Finally, thermoplastic vulcanizate elastomers (TPV) include ethylene propylene monomer (EPM) rubber, ethylene propylene dienemonomer (EPDM) rubber, fluroelastomer (FKM, and FEPM), perfluoroelastomers (FFKM) and the like.

Further, a Shore hardness of the elastic polymer reinforcing film 240 is from 30 to 80 (Shore A, A Type). Hardness refers to the magnitude of resistance to deformation of an object to be measured when the object is pressed by another object. It is roughly classified into Vickers hardness, Brinell hardness, Rockwell hardness and Shore hardness. The above-described elastic polymer is measured and indicated by Shore hardness. A Shore hardness tester measures a rebounding velocity of various types of indenters (needle shape) after pressing an object with the indenters which are classified into A, B, C, D and OO depending on the shape of an indenter. The elastic polymer reinforcing film 240 is desirably of type A with a hardness of 30 to 80. This is because if the elastic polymer reinforcing film 240 has a hardness of less than 30, it is difficult to effectively cut the outermost electrode in the electrode assembly due to its low hardness and if the elastic polymer reinforcing film 240 has a hardness of more than 80, it can damage the case and the electrode assembly during bending or distortion and thus make it difficult for the flexible battery to perform normally.

Figure 5:
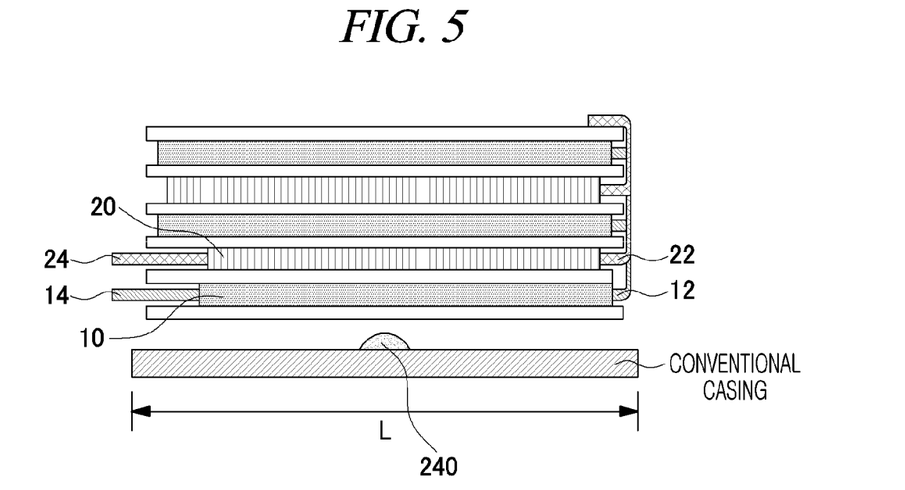
FIG. 5 illustrates that a general case having a flat pattern overlapped with an elastic polymer film covers the outside of the electrode assembly.

FIG. 5 illustrates that a general case having a flat pattern overlapped with an elastic polymer film covers the outside of the electrode assembly according to a comparative example to the example of the present disclosure.

Figure 6:
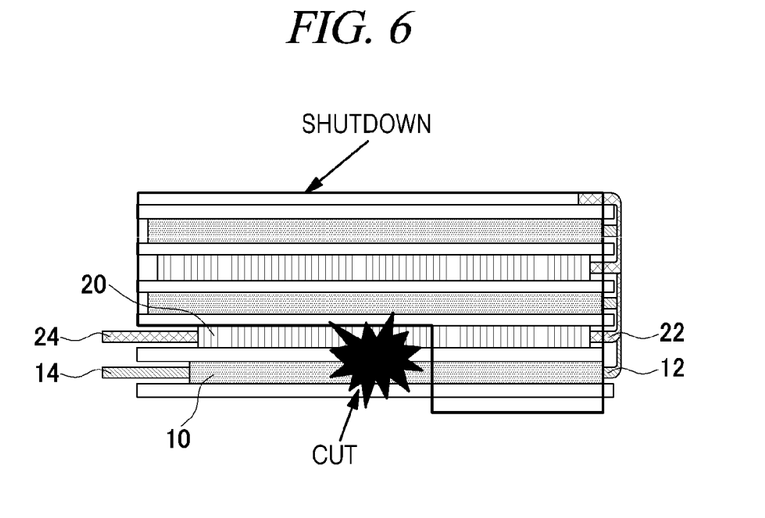
FIG. 6 shows that when the outermost electrode is cut, the other internal electrodes included in the electrode assembly are put in a shutdown state.

FIG. 6 shows that when the outermost electrode is cut, the other internal electrodes included in the electrode assembly are put in a shutdown state according to the present disclosure.

Specifically, a plurality of batteries included in the electrode assembly is connected to each other by the parallel connection tab o the right side, and a terminal is formed at an electrode lead connection tab on the outermost electrode on a lower stage of the plurality of batteries.

In this state, when an external force such as bending and distortion is applied onto the electrode assembly from the outside, the outermost electrode placed on the lower stage is damaged and cut preferentially over the electrodes placed inside the electrode assembly.

In this case, if the outermost electrode equipped with the electrode lead connection tab is broken, the electrodes connected by the parallel connection tap are not supplied with a current and are put in a shutdown state. Therefore, the capacity is sharply reduced and the battery cannot perform its original function. Accordingly, unlike conventional batteries, the battery of the present disclosure provides a function to suppress the risk of ignition that may occur due to an internal short circuit when it is continuously used in spite of damage to the internal electrodes.

To this end, the present disclosure includes cutting of the electrode equipped with the electrode lead connection tab before the breakage of the case and an internal short circuit occur by appropriately using the type and placement of the outermost electrode. This intended structure can be applied to a device that protects a battery safely against the risk of carelessness or excessive bending of the user and needs to secure and control the performance of a flexible battery when the flexible battery is bent a predetermined number of times or more by an external force.

Figure 7:
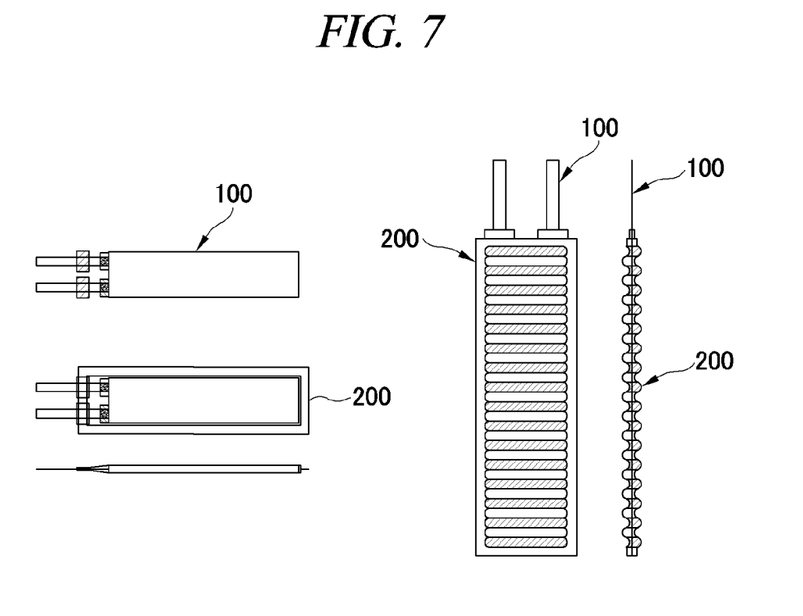
FIG. 7 illustrates a flexible battery having an electrode assembly and a case covering the electrode assembly.

Referring to FIG. 7, the electrode assembly according to the present disclosure is equipped with the case 200 having a structure in which upper stamped portions and lower stamped portions are repeatedly stamped to cover the outside of the electrode assembly.

Figure 8:
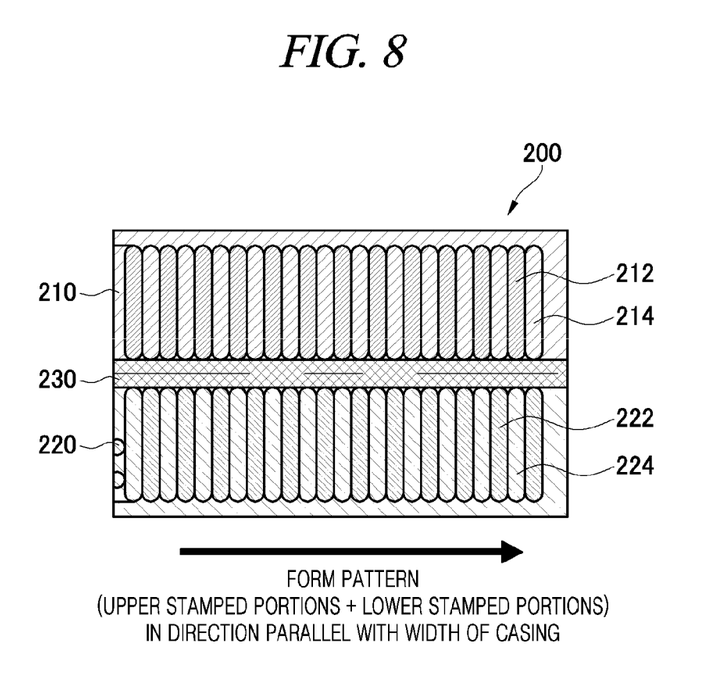
FIG. 8 illustrates that in a case forming a flexible battery, a pattern including upper stamped portions and lower stamped portions is formed in a direction parallel with the width of the case.

Referring to FIG. 8, the upper stamped portions and lower stamped portions repeatedly stamped on the case have a repeated pattern and shape so that the flexible battery having the electrode assembly can be compressed and tensioned in movements such as bending, distortion or crumpling.

The upper stamped portions and the lower stamped portions are continuously formed in a direction parallel with the width of the electrode assembly and the case.

The upper stamped portions and the lower stamped portions are stamped by an upper mold and a lower mold, respectively.

The case covering the outside of the electrode assembly may have an upper case part 210 and a lower case part 220 on the electrode assembly with reference to a red dotted line of a sealing portion 230. That is, multiple upper stamped portions 212 and 222 and multiple lower stamped portions 214 and 224 repeated on the case are formed symmetrically with respect to the sealing portion and stamped symmetrically on the upper case part 210 and the lower case part 220, respectively. In this state, the sealing portion is bent symmetrically upward and downward and then the electrode assembly is housed in the case.

The width of the sealing portion, which is a reference for separating the upper case part 210 and the lower case part 220, may be 3 mm to 5 mm and the actual sealing width may be 1 mm to 2 mm. However, this is just an example and the present disclosure is not limited thereto.

Figure 9:
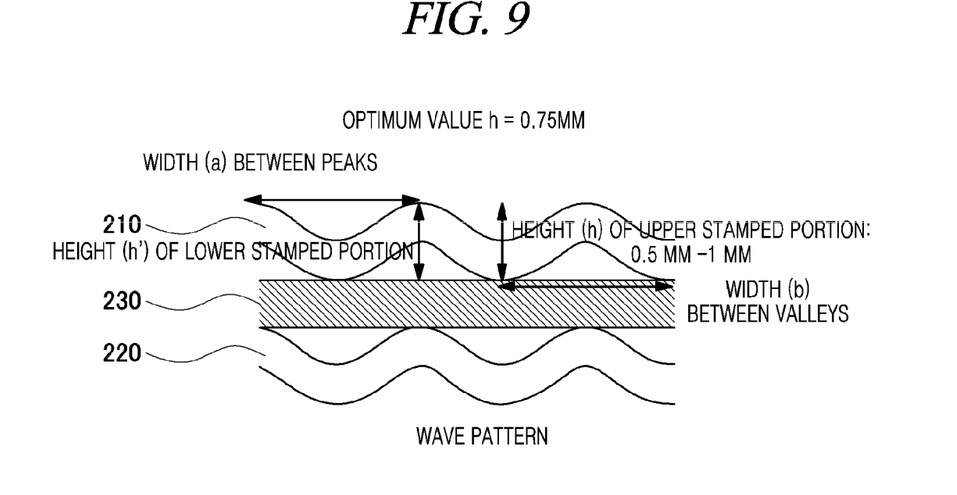
FIG. 9 illustrates a specific shape of the upper stamped portions and lower stamped portions formed in the case.

Referring to FIG. 9, a height h of the multiple upper stamped portions repeated on the case may be the same as a height h' of the multiple lower stamped portions repeated on the case (h=h').

The height h of the multiple upper stamped portions and the height h' of the multiple lower stamped portions repeated on the case are 0.5 mm to 1 mm and optimally 0.75 mm. However, this is just an example and the present disclosure is not limited thereto.

The thickness of the elastic polymer film thermally compressed by the height h of the upper stamped portions and the height h' of the lower stamped portions formed on the case is determined to be 0.5 mm to 1 mm. However, this is just an example and the present disclosure is not limited thereto.

If the thickness of the elastic polymer film is less than 0.5 mm, cutting of the outermost electrode cannot be effectively induced. If the thickness is more than 1 mm, a high pressure is applied to the electrode assembly and the case by the elastic polymer reinforcing film portion, and, thus, the case can be damaged, such as crumpling, or broken and the outermost electrode can be cut, which may cause a temporary overvoltage and thus makes it difficult to perform flexible and normal electrochemical operations.

A width between the peaks of the multiple upper stamped portions adjacent to each other on the case is the same as a width b between the valleys of the lower stamped portions (a=b), and, thus, a wave pattern is formed.

In the present disclosure, a negative electrode is placed as the outermost electrode in the electrode assembly including multiple electrodes stacked vertically with a separator to suppress the breakage of an electrode terminal when the flexible battery is bent.

Figure 10:
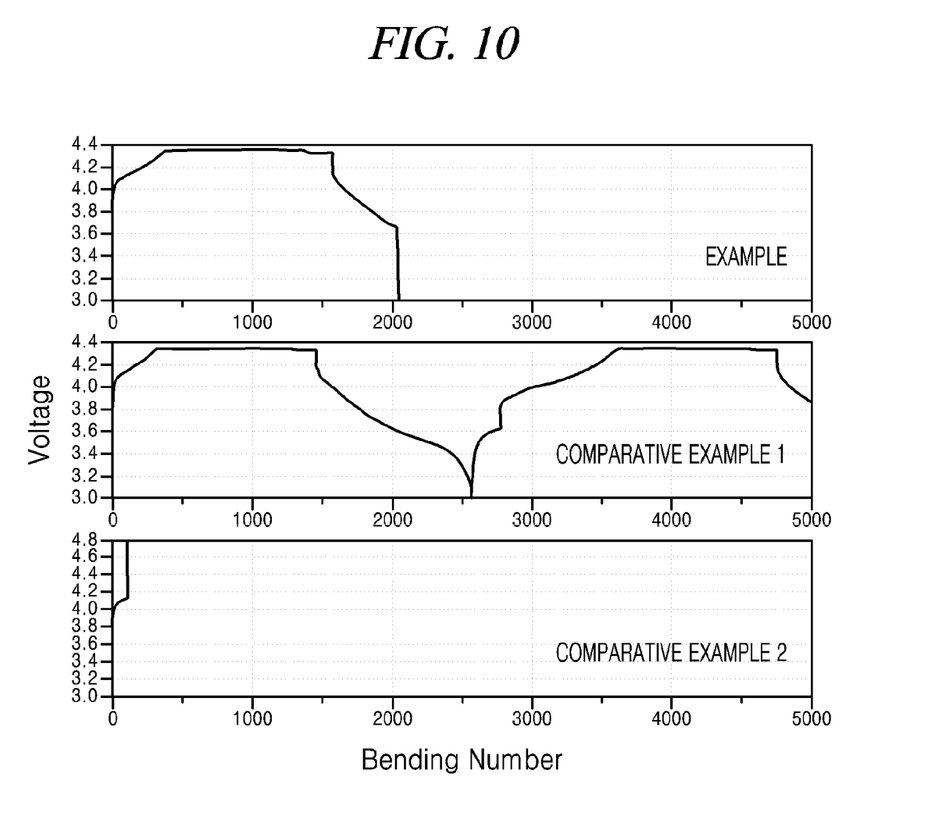
FIG. 10 shows the results of repeated bending tests on an example where a case has a corrugated pattern locally overlapped with an elastic polymer film according to the present disclosure and other comparative examples.

FIG. 10 shows the results of repeated bending tests on an example where a case has a corrugated pattern locally overlapped with an elastic polymer film according to the present disclosure and other comparative examples.

The graph at the top of FIG. 10 shows an example according to the present disclosure. It can be seen that there is no damage to a corrugation of a case and a sealing portion after the bending test, but an outermost electrode is cut by bending about 2,000 times.

Specifically, in a battery equipped with an elastic polymer reinforcing film locally inside a case having a corrugated pattern as an example according to the present disclosure, the outermost electrode is cut by bending about 2,000 times and the capacity is sharply reduced and the voltage drops to be equal to or less than the operating voltage. Thus, the battery according to the example shows much higher bending durability than that of a comparative example 1 as shown in the graph at the bottom of FIG. 10.

It can be seen that force is continuously concentrated on the outermost electrode facing the elastic polymer reinforcing film locally formed inside the case having the corrugated pattern, which induces a crack of a mixture layer of the outermost electrode and cutting of a current collector.

The graph at the bottom of FIG. 10 shows the comparative example 1 in which a general case having a flat pattern overlapped with an elastic polymer film as shown in FIG. 5 covers the outside of an electrode assembly.

In the comparative example 1, the case is damaged and the outermost electrode is cut.

In the comparative example 1, it can be seen that when the bending test is performed at 25 cpm (25 times/minute), the case is damaged and the outermost electrode is cut by bending less than 100 times and the voltage suddenly increases.

This is because although the input current is constant, the outermost electrode is cut and the other general electrodes connected by the parallel connection tab are put in a shutdown state where the current is cut off, and, thus, the capacity is sharply reduced and the resistance increases accordingly, which causes a sudden overvoltage. In a general battery, all electrodes are bound together to be connected to the outside. However, in the present disclosure, there is only one electrode that is equipped with a current flow path, i.e., an electrode lead connection tab, to the outside of the battery, and, thus, disconnection of the battery occurs at the same time when the outermost electrode is cut.

The graph in the middle of FIG. 10 shows a comparative example 2. It can be seen that a case is not damaged and the outermost electrode is not cut. Meanwhile, both the electrode and the case are damaged by bending 8,000 times or more.

In the comparative example 2 which is a general flexible battery, it is highly likely that the case is broken by repeated bending about 8,000 times or an internal short circuit is caused by the precipitation of lithium.

The present disclosure employs the case having a flat pattern overlapped with an elastic polymer film before the occurrence of the short circuit or the like, and, thus, it is possible to intentionally induce cutting of the outermost electrode first by bending 8,000 times or less.

According to a result of many tests as described above, the elastic polymer reinforcing film is formed locally inside the case having the corrugated pattern, so that cutting of the electrode at a local portion and disconnection of the battery occur when bending is performed about 1,500 times to 2,500 times. Thus, the safety in use of the battery can be secured by intentionally designing damage and cutting of the outermost electrode before excessive number of times of bending that is highly likely to cause damage to the case or incur an internal short circuit caused by the precipitation of lithium.

The present disclosure relates to a structure in which when tensile stress and compressive stress caused by bending from the outside are repetitively applied to an electrode assembly, a portion of the outermost electrode facing a partial region of the case locally overlapped with an elastic polymer reinforcing film is cut because it is locally applied with severer stress caused by repeated warpage and bending from the outside than the other portion, and, thus, the current is cut off. Therefore, this structure enables a battery to lose its function to protect the battery against risks caused by carelessness or excessive bending of the user and secures the safety in use.

Industrial Applicability

The present disclosure can be applied to a flexible lithium ion secondary battery.

We claim:

1. A secondary battery, comprising:
an electrode assembly; and
a case covering the outside of the electrode assembly,
wherein the electrode assembly includes one or more unit cells each equipped with a pair of electrodes having different polarities with a separator interposed therebetween;
an electrode mixture coated on one or both surfaces of the pair of electrodes; and
electrode tabs protruding from the respective electrodes, wherein
the electrode tabs include an electrode parallel connection tab and an electrode lead connection tab,
the electrode lead connection tab is formed on a first end of an outermost electrode among the electrodes included in the electrode assembly,
the electrode parallel connection tab is formed on a second end opposite to the first end of the outermost electrode, and
an elastic polymer film is provided at between the electrode lead connection tab of the outermost electrode and the electrode parallel connection tab of the outermost electrode and facing an outer surface of the outermost electrode inside the case such that internal electrodes included in the electrode assembly are put in a shutdown state by inducing a cutting of the outermost electrode facing the elastic polymer film before breakage of the case during repeated bending of the secondary battery, and
wherein a thickness of the elastic polymer film is 0.5 mm or more and 1 mm or less, and
wherein a local portion of the outermost electrode on which the elastic polymer film is overlapped is X which is equal to $\frac{1}{15}$ to $\frac{1}{3}$ of an entire length L of the case,
wherein the case has upper stamped portions and lower stamped portions that are repeatedly formed, and the elastic polymer film is thermally compressed on valleys formed by the upper stamped portions and the lower stamped portions.

2. The secondary battery of claim 1, wherein a Shore hardness of the elastic polymer film is from 30 to 80 (Shore A, A Type).

3. The secondary battery of claim 1, wherein the elastic polymer film contains any one or more polymers selected from the group consisting of unsaturated rubbers that can be cured by sulfur vulcanization, saturated rubbers that cannot be cured by sulfur vulcanization, and thermoplastic elastomers.

4. The secondary battery of claim 1, wherein the outermost electrode includes an outermost negative electrode placed on an outermost region and an outermost positive electrode placed adjacent to and facing the outermost negative electrode with a separator interposed therebetween, and each of the outermost negative electrode and the outermost positive electrode is equipped with the electrode parallel connection tab and the electrode lead connection tab.

5. The secondary battery of claim 1, wherein the electrode assembly further includes a reinforcing tab joined to the electrode lead connection tab.

6. The secondary battery of claim 1, wherein the secondary battery comprises an electrode lead that includes a bending structure that is joined on the electrode lead connection tab to be bent from the electrode assembly toward the outside of the electrode assembly.

7. The secondary battery of claim 5, wherein a tab-lead joint portion is located using the reinforcing tab is inserted in the separator.

8. The secondary battery of claim 6, wherein the tab-lead joint portion in which the electrode lead connection tab and the electrode lead having the bending structure are joined to each other is inserted in the separator.

9. The secondary battery of claim 1, wherein one surface of the outermost electrode placed on each of an uppermost stage and a lowermost stage of the electrode assembly is coated with the electrode mixture.

10. The secondary battery of claim 1, wherein a width Y of the elastic polymer film in an extension direction of the upper stamped portions and lower stamped portions is smaller than the width of a sealing portion formed on both ends of the case.

11. The secondary battery of claim 1, wherein a width Y of the elastic polymer film in an extension direction of the upper stamped portions and lower stamped portions is equal to the width of the electrode.

12. The secondary battery of claim 1, wherein the inducing the cutting of the outermost electrode facing the elastic polymer film is induced by adhesion inside the case based on the length of the overlapped local portion of the elastic polymer film and the repeated bending of the secondary battery.

* * * * *